G. M. HUBBARD.
Trace-Buckle.

No. 219,864.                    Patented Sept. 23, 1879.

Witnesses.                      Geo. M. Hubbard
                                      Inventor.
                                By atty.

UNITED STATES PATENT OFFICE

GEORGE M. HUBBARD, OF NEW HAVEN, CONNECTICUT, ASSIGNOR TO O. B. NORTH & CO., OF SAME PLACE.

IMPROVEMENT IN TRACE-BUCKLES.

Specification forming part of Letters Patent No. 219,864, dated September 23, 1879; application filed May 27, 1879.

*To all whom it may concern:*

Be it known that I, GEORGE M. HUBBARD, of New Haven, in the county of New Haven and State of Connecticut, have invented a new Improvement in Trace-Buckles; and I do hereby declare the following, when taken in connection with the accompanying drawings and the letters of reference marked thereon, to be a full, clear, and exact description of the same, and which said drawings constitute part of this specification, and represent, in—

Figure 1:
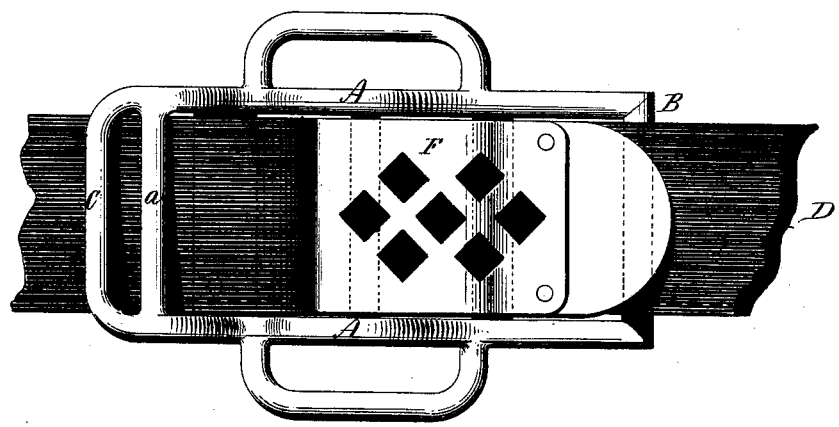
Figure 2:
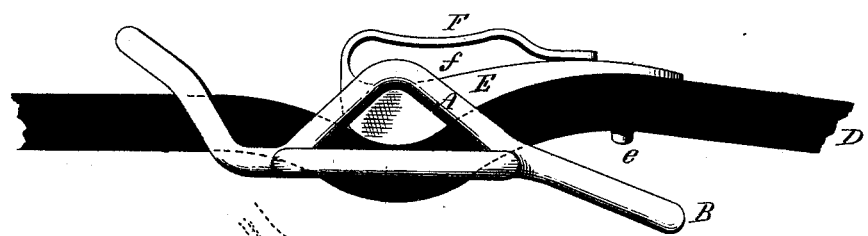
Figure 3:
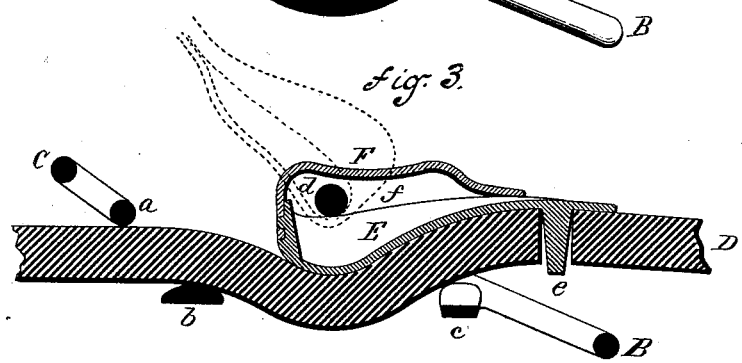

Figure 1, front view; Fig. 2, side view; Fig. 3, longitudinal central section.

This invention relates to an improvement in that class of buckles used for adjusting the traces of harness, and known as "trace-buckles;" and the invention consists in the construction as hereinafter described, and particularly recited in the claim.

A A are the two sides of the frame, the bar B at the forward end forming the tug-loop, and the bar C at the rear end the breeching-loop, with intermediate cross-bars $a$, $b$, $c$, and $d$, the sides of the frame curved, as seen in Fig. 2, and so as to give to the bars the relative position seen in Fig. 3, the two bars $b$ and $c$ being on the inside and the two bars $a$ $d$ on the outside, the trace D passing between the inside and outside bars.

E is the securing-plate, of substantially wedge shape, but curved upward at its rear end and arranged beneath the bar $d$, and so that the bar will rest upon the back of the plate E, as seen in Fig. 3. Near the forward end of the plate E is a stud or tongue, $e$, arranged to extend into a perforation in the trace.

On the plate E is a metal strap, F, attached to the rear or larger end of the plate E, and extending forward over the bar D, as seen in Fig. 3, and so as to form a space, $f$, and the plate E below, and so as to allow the plate E free longitudinal movement, and also permit it to be turned on the bar as a hinge, as seen in broken lines, Fig. 3. This completes the construction. The trace is passed directly through, first between the bars $a$ $b$; thence under the plate E, which has been turned outward, as seen in broken lines, Fig. 3; thence over bar $c$; then the plate E is turned down, the bar $d$ acting as a fulcrum, and the larger end, acting as a cam, bends the trace between the bars $b$ $c$, and the stud $e$ enters the perforation in the trace. The draft upon the trace draws it with the plate E rearward, griping the trace firmly between the rear end of the plate E and the bar $b$, as shown.

It will be seen that by this construction there are combined all the advantages of both a cam and wedge buckle, the plate E acting as a cam to admit and secure the trace, and as a wedge to increase the gripe upon the trace as the strain is increased.

The end C may be dispensed with. In that case the bar $a$ becomes the end.

From the foregoing it will be understood that I do not broadly claim either a swinging cam or a sliding wedge; but What I do claim is—

A buckle having the under bars, $b$ $c$, to support the trace, and the cam-shaped plate E, hung upon the upper cross-bar, $d$, so as to turn and also move longitudinally thereon, and adapted to crowd the strap between the under bars, substantially as described.

GEORGE M. HUBBARD.

Witnesses:
J. H. SHUMWAY,
JOS. C. EARLE.